(No Model.) 2 Sheets—Sheet 1.
J. B. HOLMES.
TWINE REEL AND HOLDER.
No. 492,162. Patented Feb. 21, 1893.
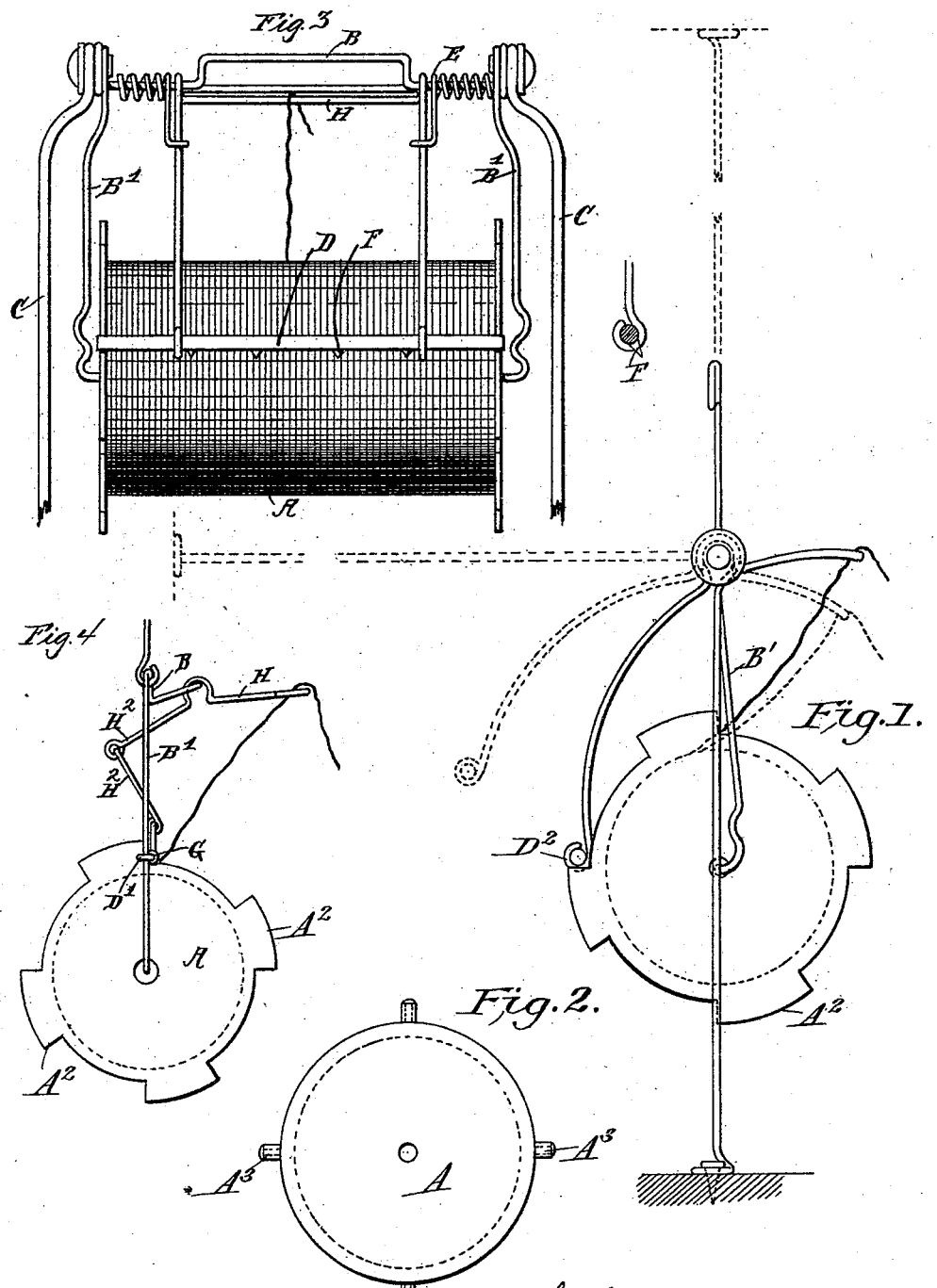
Witnesses
Frank Thomas
Wm. R. Fowler
J. B. Holmes Inventor
By his Attorney (No Model.) 2 Sheets—Sheet 2.
J. B. HOLMES.
TWINE REEL AND HOLDER.
No. 492,162. Patented Feb. 21, 1893.
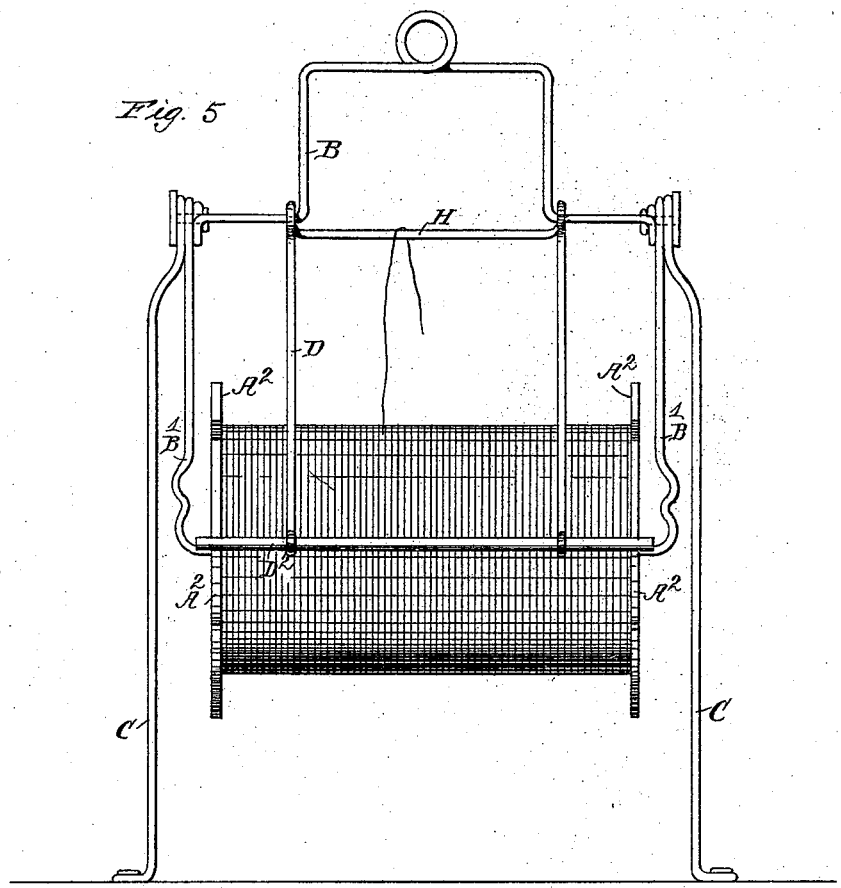
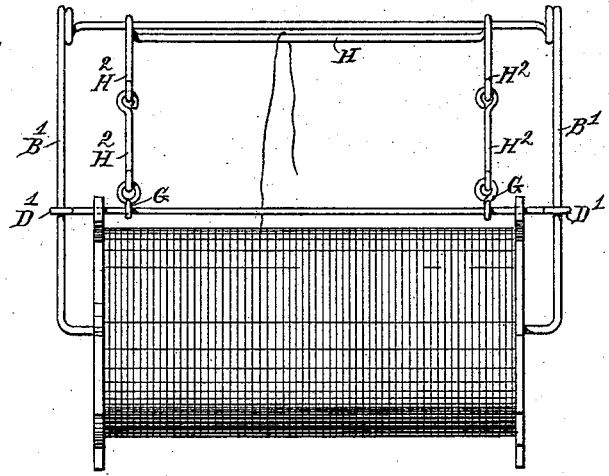
THE NORRIS PETERS CO., PHOTO-LITHO., WASHINGTON, D. C.

UNITED STATES PATENT OFFICE.

JOHN BRIGGS HOLMES, OF NEW YORK, N. Y.

TWINE REEL AND HOLDER.

SPECIFICATION forming part of Letters Patent No. 492,162, dated February 21, 1893.

Application filed April 15, 1891. Serial No. 389,001. (No model.)

*To all whom it may concern:*

Be it known that I, JOHN BRIGGS HOLMES, a citizen of the United States, and a resident of New York, county and State of New York, I have invented a certain new and useful Improvement in Twine Reels and Holders, of which the following is a specification.

My invention relates to twine reels and in particular to devices used for checking the momentum of the spool and thus preventing any undue amount of the cord, &c., being paid out after the required quantity has been used and it consists in the provision of a device simple in construction, economical in manufacture and efficient in practical use.

To attain the desired end my invention consists in the construction and arrangement of parts hereinafter described and claimed.

In the drawings which form a part of this specification Figures 1, 2, and 4 represent side elevations of articles constructed according to my invention, and Fig. 3 is a rear view of another article so made. Fig. 5 is a front elevation of the reel shown in Fig. 1 and Fig. 6 is a front elevation of the holder represented in Fig. 4.

Like letters of reference wherever they occur indicate corresponding parts in all the figures.

Heretofore great difficulty has been met in the use of twine, &c. wound upon reels, and in order to avoid the great inconvenience and annoyance resulting from the cord, &c. becoming partially unwound from the spool— thus liable to become entangled—and also to provide a means for checking the momentum of the reel the moment the pulling motion on the twine, &c., therefrom depending ceases— thus preventing too much line being paid out and the unsightly loop formed by the slack cord which is liable to become caught in the reel—I use in connection with the same a self acting brake whereby the spool is instantly stopped.

Referring again to the drawings A represents the spool or reel proper which may be constructed of paper, wood, iron or other substance suitable for winding thereon cord, twine, rope, wire, &c.

The reel A, is held in a frame B, provided with depending arms B', placed on opposite sides of the spool A, and the respective ends of which are adapted and arranged to enter the longitudinal central bore of the spool A. The reel is also preferably provided with a supporting adjustable or shifting stand C, by means of which it may be secured to a counter, or to the ceiling or to a side wall, by manipulating the stand C, so as to cause it to assume its proper position in view of the particular circumstances of its use.

In order to check the momentum of the reel caused by unwinding the cord, &c., therefrom, I provide the same with a brake D. This brake D, may be weighted as represented at D' in Fig. 4, so as to fall by gravity and to bear down with sufficient force upon the reel A, to stop the same; or else the brake D, may be held down by a coiled spring E as shown in Fig. 3 (with or without the use of pins or teeth F, on the brake as represented in Fig. 3) in order to serve the purpose desired. Or in preferred construction, the arms of the brake may be provided with lateral extensions $D^2$, and thereby adapted to engage with projections (as flanges $A^2$ Fig. 1, or studs $A^3$, Fig. 2) located upon the edges of the spool or reel A;—cushions G, of rubber felt, or equivalent material being placed upon the said extensions or brake, or both, in order to deaden the noise arising from the contact consequent upon the revolution of the spool being stopped by the operation of the brake. The brake D, is raised and the spool A released by means of the depression of the forwardly projecting bar H, of the said brake (Figs. 1 and 4) caused by the act of pulling down the cord, &c., which cord is passed from the reel A, over the said bar H, and thence downward in order to be readily grasped by the operator.

It is obvious that the connecting links $H^2$ in Fig. 4, located between the brake and projecting bar H, may be dispensed with, and the brake D, raised directly by means of the cord, &c. itself.

As it is evident that many slight changes in the construction and relative arrangement of parts might be resorted to without departing from the spirit and scope of my invention I would have it understood that I do not restrict myself to the particular construction and arrangement of parts shown and described but that I reserve the right to make such changes and that

What I claim as new, and desire to secure by Letters Patent, is—

1. In a twine reel the combination with a spool provided with a series of radial projections located upon the same, of a self acting brake provided with extensions constructed and arranged to engage with the said radial projections of the spool and operated by the cord whereby upon pulling the line the brake may be raised from the spool.

2. In a twine reel the combination with a spool A provided with a series of radial projections, and with cushions G, of a supporting frame B, and of a self acting brake D, constructed and arranged to engage with the said radial projections of the reel and to be operated by the cord.

3. In a twine reel the combination with a spool A. provided with a series of radial projections and with cushions G, of a supporting frame B, a self acting brake D, to engage the said radial projections and to be operated by the cord, and of an inclosing shifting stand C constructed and arranged to support the whole.

In testimony of the foregoing specification I do hereby sign the same, in the city of New York, county and State of New York, this 17th day of March, A. D. 1891.

JOHN BRIGGS HOLMES.

Witnesses:
J. ODELL FOWLER, Jr.,
THOS. J. O'SULLIVAN.